(No Model.)

W. W. DOOLITTLE.
PIPE SLEEVE.

No. 560,847. Patented May 26, 1896.

Witnesses
W. C. Coolies
C. H. Crawford.

Inventor
William W. Doolittle
by his atty — Paul Synnestvedt

UNITED STATES PATENT OFFICE.

WILLIAM W. DOOLITTLE, OF CHICAGO, ILLINOIS, ASSIGNOR TO THE CRANE COMPANY, OF SAME PLACE.

PIPE-SLEEVE.

SPECIFICATION forming part of Letters Patent No. 560,847, dated May 26, 1896.

Application filed July 27, 1895. Serial No. 557,320. (No model.)

*To all whom it may concern:*

Be it known that I, WILLIAM W. DOOLITTLE, a citizen of the United States, residing at Chicago, in the county of Cook and State of Illinois, have invented certain new and useful Improvements in Pipe-Sleeves, of which the following is a specification.

My invention relates to that class of devices commonly used to insulate pipes where they pass through a wall or floor, to guard against danger of fire should the pipes become too hot.

More specifically, my invention consists in the construction of a pipe sleeve or insulator of a more convenient, simple, and economical form than are those at present in most common use.

To better understand my invention, reference may be had to the accompanying drawings, in which—

Figure 1:
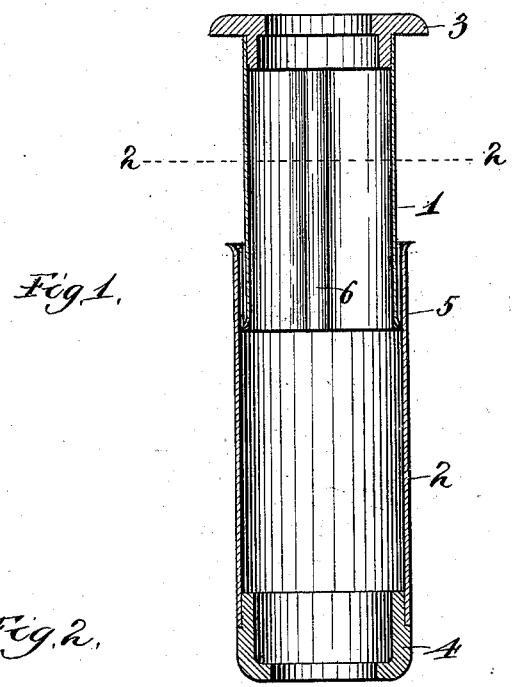
Figure 2:
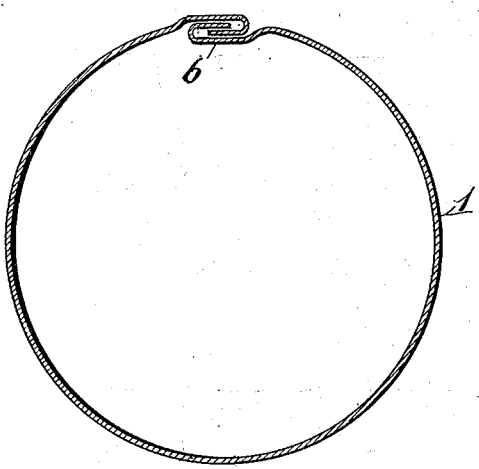
Figure 3:
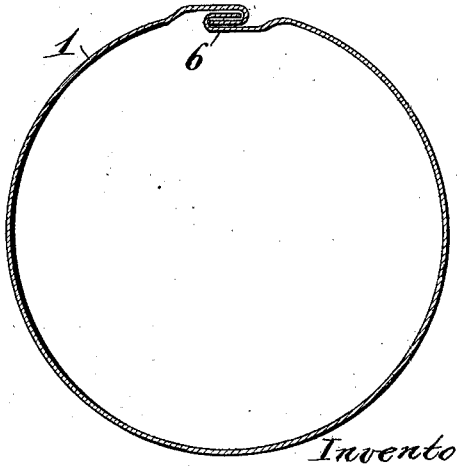

Figure 1 is a vertical section of my improved sleeve, taken on the line A A of Fig. 2. Fig. 2 is a horizontal section taken on the line B B of Fig. 1. Fig. 3 is another horizontal section taken on the same line as Fig. 2, but with the parts in a slightly-different position.

The general construction of devices of this class is too well known to need detailed description here. Parts 1 and 2 are the telescoping portions of the sleeve, and 3 and 4 the upper and lower flanges, these all in general being arranged the same as in other constructions well known in the art.

In the practice of my invention the part 1, at its lower end, is flared outwardly in a kind of bell shape, as shown at 5, until its extreme normal diameter is a very little greater than the inner diameter of the part 2. This, when the part 1 is put into the part 2, causes a binding of the two together, which, though sufficiently tight to hold the parts securely in any fixed position relative to each other, is still free enough to permit of ready adjustment by hand when occasion requires. The flared part 5 is found in practice to afford sufficient elasticity in itself to permit of reasonable freedom of adjustment; but in order to improve the device still further the seam along the side of the part 1, (shown in section at 6 in Fig. 2,) especially that part of it which is near the end or place of contact, is made sufficiently loose to permit of a slight inward movement of the two edges or joined portions against the resilient resistance of the tube, the elasticity of the rolled metal tending to retain its normal diameter, affording additional pressure on the contact-surface and at the same time an increased elasticity.

In Fig. 2 the tube is shown contracted and in Fig. 3 it is shown expanded, the amount of movement of the overlapping edges being somewhat exaggerated to more clearly illustrate the idea.

I am aware that it is not new to construct a pipe-sleeve of two telescopic sections of sheet metal, in which frictional contact between the two sections is secured by crimping or forming a bead or beads around one or both of the parts, the raised portion forming the point of contact; but such construction, lacking, as it does, the advantages of my invention, I hereby disclaim. With the construction referred to it is very difficult to secure the proper amount of frictional resistance to adjustment. It is generally either too tight or too loose, and in either case cannot conveniently be made right, whereas in the use of my invention it is a very easy matter to change the amount of projection of the flared part or contact-surface with almost any common hand-tool, and thus secure just exactly the pressure or resistance desired. Such prior devices also require the use of special and nicely adjusted machinery for their manufacture, whereas my construction can readily be made without such aids, and is therefore of more economical design, which is considerable of an item in a competitive field.

Having thus described my invention, what I claim as new, and desire to secure by Letters Patent, is—

1. In a pipe-sleeve, the combination of two telescopic sections, the inner of which has its interior end flared outwardly, and the connection or seam at its edges loose, substantially as described, to afford frictional and resilient contact between said sections.

2. In a pipe-sleeve, the combination of two telescopic sections, 1 and 2, the inner of which has its interior end flared outwardly, and the connection or seam at its edges loose, to afford frictional and resilient contact between said sections, and the end pieces 3 and 4, arranged substantially as shown and described.

WILLIAM W. DOOLITTLE.

Witnesses:
F. N. WINNE,
W. W. GARRARD.